Dec. 18, 1962     A. W. HENKE     3,069,645
PRESSURE-RESISTANCE TRANSDUCERS
Filed Feb. 1, 1960

INVENTOR.
Arthur W. Henke
BY George E. Johnson
ATTORNEY

United States Patent Office 3,069,645
Patented Dec. 18, 1962

3,069,645
PRESSURE-RESISTANCE TRANSDUCERS
Arthur W. Henke, Flint, Mich., assignor to General Motors Corporation, Detroit, Mich., a corporation of Delaware
Filed Feb. 1, 1960, Ser. No. 6,012
1 Claim. (Cl. 338—39)

This invention relates to pressure actuated devices and more particularly to transducers for securing electrical resistances in accordance with variations in fluid pressures.

An object of the present invention is to provide an improved transducer of rugged and compact construction whereby an indication of a pressure variation may be transmitted to an instrument such as a gage by means of proportionate electric resistance set up in a circuit actuating the gage. Another object is to provide a transducer which incurs little or no frictional losses in proportioning an electrical resistance with respect to a variation in a force and as induced by fluid pressure.

To these ends, a feature of the invention is a transducer employing a rolling seal diaphragm for transmitting a pressure force to compress spring means thereby varying electrical resistance in accordance with variations in that pressure. Another feature is a resistance coil so associated in a transducer as to occasion an accurate degree of calibration during manufacture of the transducer.

These and other important features of the invention will now be described in detail in the specification and then pointed out more particularly in the appended claim.

Figure 1:
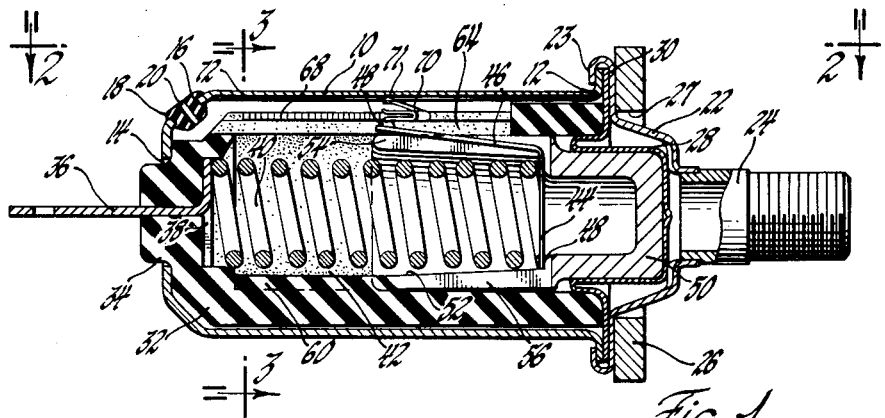
FIGURE 1 is a sectional view taken through a transducer in which the present invention is embodied.

In the drawings, a transducer for converting a fluid pressure to a definite and proportional electrical resistance value is shown as embodying a metal shell 10 of cylindrical configuration having an outstanding flange 12 at one end and being closed at the other end except for an axial opening 14 and a vent opening 16. The latter is partially blocked by a rubber plug 18 perforated at its center to accommodate a fiber glass thread 20.

The casing of the transducer also includes a metal socket 22, a threaded pipe inlet 24 and a nut 26 having an opening 27 to accommodate a main body of the socket 22. These parts of the transducer casing are all joined together by means of silver soldering or some such suitable method. The tight closure is improved by rolling of the margin 23 of the socket 22 to engage the flange 12 of the shell 10.

The periphery of a flexible rolling seal diaphragm 28 is held clamped between the flange 12 and an annular flat portion 30 of the socket 22.

A dielectric body member 32 of molded thermosetting-phenolic plastic is encased within the shell 10 and has a protruding knob 34 integral therewith. This knob extends a short distance and outwardly through the opening 14 in the shell. A flat terminal 36 is molded into the plastic protuberance 34 and includes a flat circular portion 38 serving as a supporting base for one end of a coil spring 40 located within a spring chamber 42 formed within the body member 32. The other end of the spring 40 is seated against a metallic disk 44 which is integral with a resilient contact arm 46 bearing a contact 48 at its free end. The disk 44 rests against an annular shoulder 48 formed within a hollow piston 50. The latter is reduced in diameter for a portion of its length to receive the rolling portion of the flexible diaphragm 28. An enlarged portion of the piston 50 is recessed as at 52 for the reception of one movable end of the spring 40 and the piston is free to slide within the chamber 42 within a given range as limited by the compressive force of the coil spring 40.

Opposite sides of the piston 50 are slotted as at 54 and 56. The arm 46 is free to move in a radial direction with respect to the axis of the spring 40 and within the slot 54. The slot 56 is adapted slideably to receive a ridge 60 formed integral with the body member 32. One side of the body member 32 is slotted as at 64 to clear the contact arm 46 and this portion of the body 32 has an exterior flat surface 66 extending in a plane substantially parallel with the spring axis. This flat surface is arranged to support a resistance coil 68 in position to be slideably contacted by the contact 48. One end of the resistance coil 68 is connected or grounded by a metal spring clamp 70 to the metal shell 10 and a tab end 71 of the spring clamp 70 rests in a slot or groove 72 formed in the inner wall of the shell 10. The spring clamp is permanently fixed in position with respect to the length of the shell 10 by an adhesive such as a resin as will further appear.

In operation of the transducer, a fluid under pressure is supplied to the pipe 24 and into the pressure chamber defined between the diaphragm 28 and the socket 22. The force resulting from an increase in the pressure will cause the diaphragm, piston 50 and one end of the spring 40 to move towards the terminal 36 a distance determined by the pressure. The linear compression of the spring 40 will be proportional to the pressure of the fluid in the socket 22. With the corresponding movement of the piston 50, the contact 48 will slide along the resistance coil 68 varying the effective number of turns or the resistance of that coil. As a result, current passing through the terminal 36, the spring 40, the contact arm 46 and the required turns of the resistance coil 68 to the casing 10 as a ground, will be inversely proportional to the pressure exerted upon the diaphragm.

The fiber glass thread 20 provides a vent to compensate for piston displacement and as most liquids will not wet fiber glass, the transducer unit will be splash proof. The plug 18 is not only used to seal the opening 16 in the metal shell 10 but it is the last part of the unit to be placed in the assembly as the opening 16 is necessary for calibration. Calibration is performed by moving the resistance unit along the surface 66 and the tab 71 along the groove 72 until the electrical resistance through the coil 68 bears a definite relation with the pressure of the fluid in the socket 22 when proper location of the resistance coil is had. A suitable glue, cement or resin is introduced through the opening 16 to secure the coil in its position.

Figure 2:
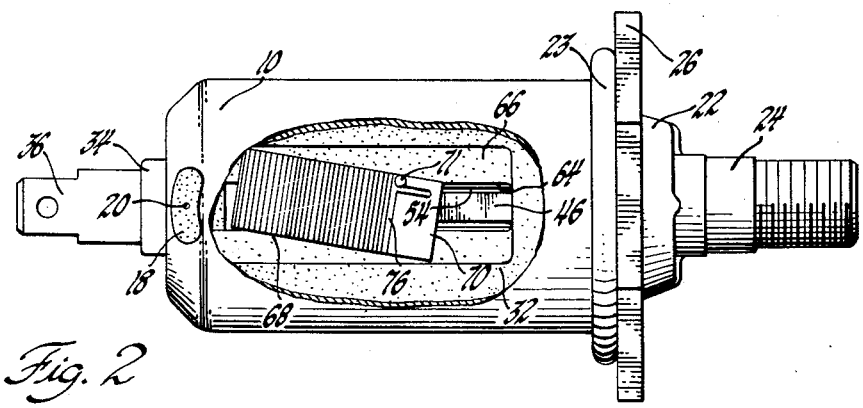
FIGURE 2 is a view of the transducer looking in the direction of the arrows 2—2 in FIGURE 1, a portion of the casing being broken away better to show the interior construction.
Figure 3:
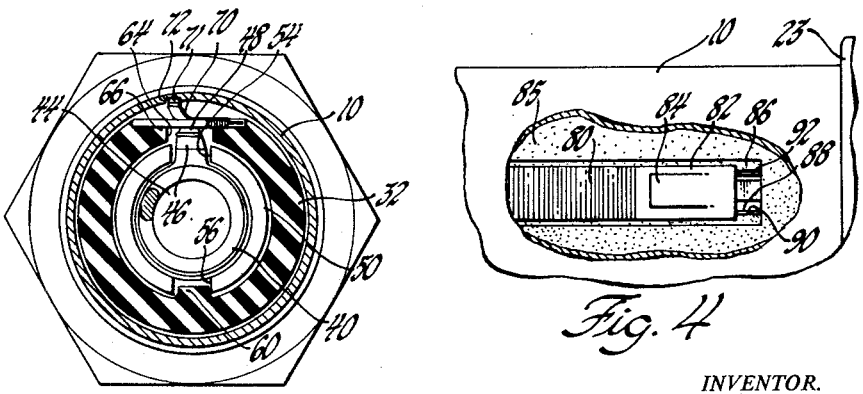
FIGURE 3 is a sectional view looking in the direction of the arrows 3—3 in FIGURE 1.

It will be noted from FIGURE 2 that the resistance coil 68 is wound on a rectangular dielectric sheet 76 and that the metal tab 71 from the clamp 70 is at one side of that coil. During assembly of the unit, the resistance coil 68 may be reached through the opening 16 and it can not only slide in a direction parallel with the axis of the spring 40 but also may be moved laterally on the surface 66 about the tab 71 as a pivot. Because of this pivotal adjustment feature more or less coils of resistance wire may be caused to be traversed by the contact 48 for a given change in fluid pressure. This tilt provision for the resistance coil about the tab 71 permits a more accurate and suitable calibration found preferable in some uses. It will be understood that once the coil is located and properly tilted for a given situation that the coil is fixed in position on surface 66 by the application of glue, cement or resin to the coil and surface 66 by way of the opening 16.

Figure 4:
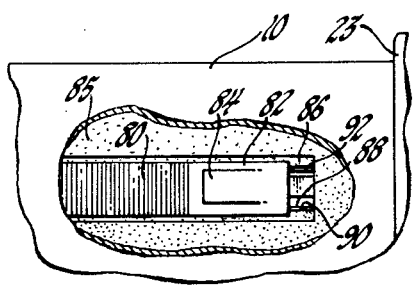
FIGURE 4 is a view similar to a portion shown in FIGURE 2 but illustrating a modified construction.

In the modification of FIGURE 4, a resistance coil 80 is used but in this instance, it is of narrow dimension and a metal clamp 82 is employed. This clamp is not suitable for tilting in calibrating the transducer but calibration may be effectively brought about by mere sliding of the coil in a direction parallel with the axis of the shell 10 and locating the spring tab 84 within a suitable groove of the shell as will be understood. A plastic body member 85 is employed which is similar to the body member 32 of FIGURE 1 except that a flat surface 86 of narrow width is used to support the coil 80. Also, two slots 88 and 90 are formed in the piston 92 and member 85 respectively to allow linear movement of a contact arm.

In both modifications the force exerted on the spring will be proportional to the applied fluid pressure. Since the spring has a linear relation of deflection and applied force, the movement of the contact 48 will be proportional to the pressure. There will be little or no appreciable friction to impede movement. In most cases, the design will be such that with no fluid pressure, the electrical resistance of the coil 68 or 80 will be non-existent. As the fluid pressure is increased, the electrical resistance will increase to a maximum value.

I claim:

A transducer comprising a metal shell, a fluid inlet and a vent at opposite ends of said shell, fiber glass in said vent to impart splash proof characteristics to the said shell, a dielectric body member encased in said shell and defining a spring chamber closed at one end, a slot in said body member, a rolling seal diaphragm interposed between said fluid inlet and said dielectric body member to close the other end of said spring chamber, a piston located and movable in said spring chamber, a compression spring in said spring chamber and urging said piston against said diaphragm and toward said fluid inlet, a calibration groove in the inside wall of said shell, a resistance coil slidably received between said shell and dielectric body member for pivotal mounting to a fixed position with respect to said groove for the purpose of calibration and being accessible through said vent, a spring clamp retained within said groove and connected to one end of said coil as the sole conductive connection between said shell and coil, a contact arm element having an end portion retained between said piston and one end of said spring, an intermediate portion extending through the said slot of said dielectric body member with another end portion of said arm slidably engaging said coil, and a terminal contacting the other end of said spring and extending from said body member and shell.

References Cited in the file of this patent

UNITED STATES PATENTS

| | | |
|---|---|---|
| 2,324,336 | Thompson | July 13, 1943 |
| 2,515,867 | Fuller | July 18, 1950 |
| 2,738,404 | Fitzsimmons | March 13, 1956 |
| 2,911,606 | Hoffman | Nov. 3, 1959 |